United States Patent
Kendall

(10) Patent No.: US 7,166,986 B2
(45) Date of Patent: Jan. 23, 2007

(54) BATTERY SAVER CIRCUIT

(75) Inventor: Scott Kendall, West Columbia, SC (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 108 days.

(21) Appl. No.: 10/786,780

(22) Filed: Feb. 25, 2004

(65) Prior Publication Data

US 2005/0184701 A1 Aug. 25, 2005

(51) Int. Cl.
*H01M 10/46* (2006.01)
(52) U.S. Cl. ...................................... 320/104
(58) Field of Classification Search ............... 320/135, 320/136, 104; 180/65.3, 65.2
See application file for complete search history.

(56) References Cited

U.S. PATENT DOCUMENTS

| | | | |
|---|---|---|---|
| 4,323,837 A | 4/1982 | Nakamura et al. | |
| 4,902,956 A | 2/1990 | Sloan | |
| 5,321,389 A | 6/1994 | Meister | |
| 5,668,465 A | 9/1997 | May | |
| 6,362,595 B1 * | 3/2002 | Burke | 320/104 |
| 6,392,384 B1 * | 5/2002 | Hwang Bo et al. | 320/116 |
| 6,491,121 B1 * | 12/2002 | Morimoto et al. | 180/65.3 |
| 6,624,533 B1 * | 9/2003 | Swanson et al. | 307/64 |
| 6,625,963 B1 * | 9/2003 | Johnson | 56/10.8 |

* cited by examiner

*Primary Examiner*—Edward H. Tso
(74) *Attorney, Agent, or Firm*—Pearne & Gordon LLP

(57) ABSTRACT

A circuit includes a battery connection portion and a motor control portion. The circuit further includes a driven component capable of receiving electric power from a battery connected to the circuit at the battery connection portion only when the motor control portion is activated.

20 Claims, 5 Drawing Sheets

BATTERY SAVER CIRCUIT

FIELD OF THE INVENTION

This application relates generally to a battery saver circuit for a device employing an internal combustion or diesel engine and having an electric starting motor. More specifically, this application relates to a circuit having a means for preventing unwanted current draw from the battery when the electric starting motor's controller, typically a solenoid, is not activated.

BACKGROUND OF THE INVENTION

Devices employing internal combustion or diesel engines typically have an electrical system that provides power to miscellaneous electrically driven components such as an electric starter, headlights, a fuel shut-off solenoid, and various relays, for example. If the control or ignition switch of such a device is left in the "ON" position while the engine is not running, it is often possible for some of the components, such as the fuel shut-off solenoid, for example, to undesirably draw current from the battery. Because the engine is not running, there is no output from the alternator to recharge the battery. In this situation, components undesirably drawing current from the battery will continue to do so until the battery has been drained.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with one aspect, the present invention provides a battery saver circuit that comprises a battery connection means, a motor control means and a current blocking means. The circuit further includes a driven component capable of receiving electric power from a battery connected to the circuit at the battery connection means only when the motor control means is activated.

In accordance with another aspect of the present invention, the circuit includes a first current blocking means and a second current blocking means. Additionally, the circuit further includes an alternator connection means. The first current blocking means prevents current flow from the battery to the driven component and allows current to flow from an alternator connected to the alternator connection means to the battery. The second current blocking means prevents current flow from the alternator to the motor control means and allows current flow from the battery to the driven component when the motor control means is activated.

In accordance with another aspect of the present invention, the battery saver circuit comprises a battery, an alternator, and an electric starting motor for starting an engine. The circuit further includes a motor control means for controlling the electric starting motor and a driven component capable of receiving electric power from either the battery or the rectified alternator output. The circuit further includes a first current blocking means and a second current blocking means. The first current blocking means prevents current flow from the battery to the driven component and allows current to flow from the alternator to the battery. The second current blocking means prevents current flow from the alternator to the motor control means and allows current flow from the battery to the driven component when the motor control means is activated.

In accordance with another aspect of the present invention, the battery saver circuit comprises a battery, an alternator, an internal regulator charger, and an electric starting motor for starting an engine. The internal regulator charger receives an input voltage from the alternator and produces a stable DC output voltage. The circuit further includes a motor control means for controlling the electric starting motor and a driven component capable of receiving electric power from either the battery or the internal regulator charger. The circuit further includes a first current blocking means and a second current blocking means. The first current blocking means prevents current flow from the battery to the driven component. The second current blocking means prevents current flow from the internal regulator charger to the motor control means and allows current flow from the battery to the driven component when the motor control means is activated.

As one example feature of the present invention, it may be desirable to energize some of the components connected to the engine's electrical system whenever the electric starter is engaged. For example, it may be desirable to energize a fuel shut-off solenoid along with the starter so that fuel would flow from the storage tank to the engine. While the starter is engaged, the battery would provide electrical power to such components. When the engine and attached alternator came up to speed, the alternator would provide power to the driven components. Therefore, the need exists for a battery saver circuit that will prevent electrically driven components from undesirably drawing current from the battery when the engine is not running, but allow current draw from the battery when the electric starter is engaged.

BRIEF DESCRIPTION OF THE DRAWINGS

Features and advantages of the present invention will become apparent to those skilled in art to which the present invention relates upon reviewing the following description with reference to the accompanying drawings wherein.

DETAILED DESCRIPTION OF EXAMPLE EMBODIMENTS

Figure 1:
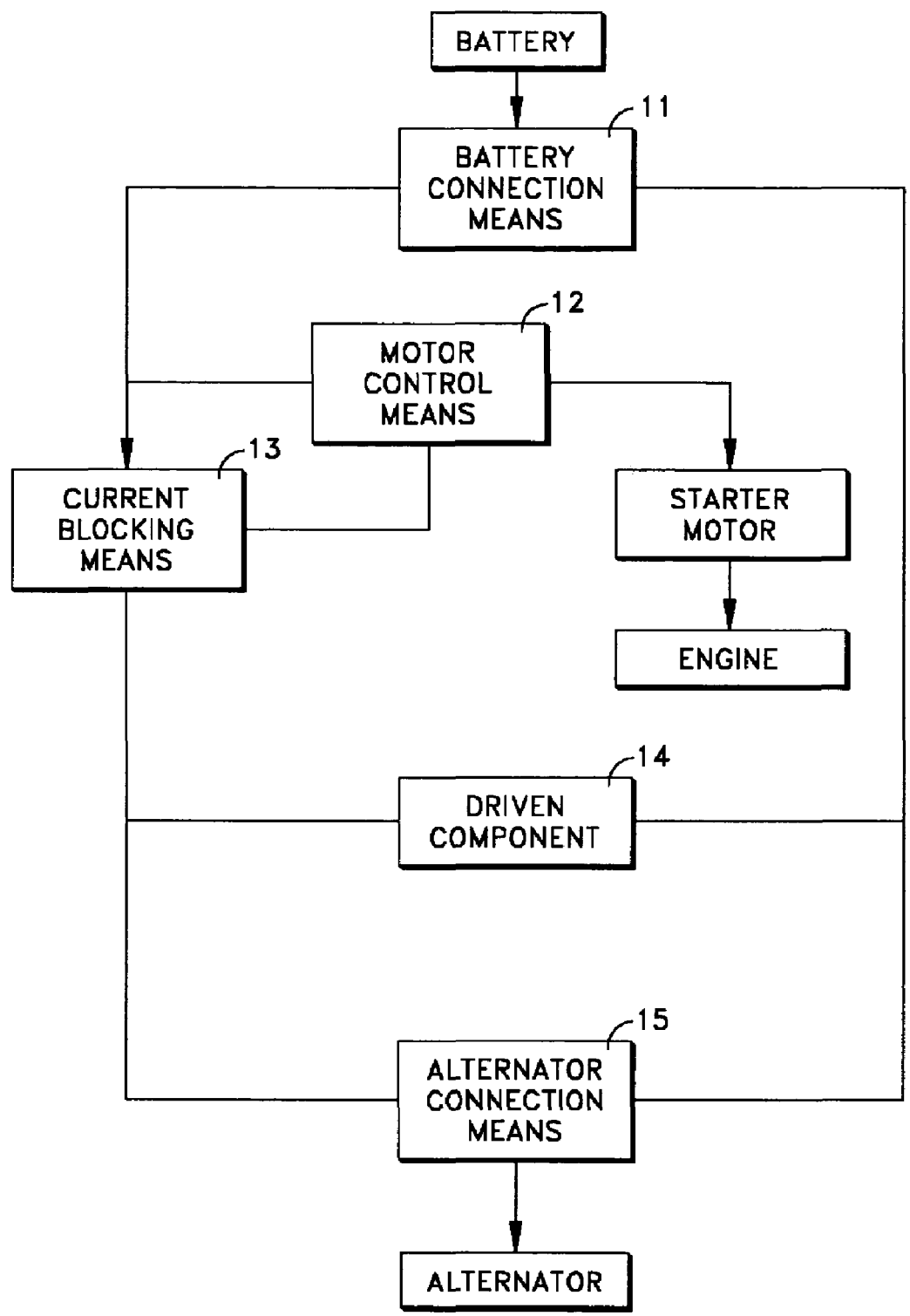
FIG. 1 is a first block diagram of an electrical system with battery protection in accordance with the present invention.

The present invention is described herein with reference to the drawings, wherein like reference numerals are used to refer to like elements throughout. It is to be appreciated that the various drawings are not necessarily drawn to scale from one figure to another nor inside a given figure, and in particular that the sizes of the components are arbitrarily drawn for facilitating the reading of the drawings. In the following description, for purposes of explanation, numerous specific details are set forth in order to provide a thorough understanding of the presented examples of the present invention. However, it is to be appreciated that the present invention may be practiced without these specific details.

FIG. 1 represents an electrical system that includes battery-protecting circuitry to prevent undesired discharging of a battery. The electrical system is designed to be used on devices that employ internal combustion or diesel engines with electric starting motors (e.g., starters).

A battery connection means 11 is provided for the electrical interconnection of a starting battery to the circuit. The purpose of the battery is to provide electrical power to an engine starting motor and other miscellaneous devices. The battery connection could be made by a mechanical means, such as, for example, by screw or compression terminals. It could also be made by other processes such as, but not limited to, welding, brazing, or soldering.

An alternator connection means 15 is provided for the electrical interconnection of an alternator to the circuit. The purpose of the alternator is to charge the starting battery and provide electrical power to all of the engine's electrical devices when the engine is running. The alternator connection could be made by a mechanical means, such as, for example, by screw or compression terminals. It could also be made by other processes such as, but not limited to, welding, brazing, or soldering.

A motor control means 12 controls the operation of the engine's electric starting motor. The motor control means 12 could comprise various switches, pushbuttons, relay contacts, or electrical interlocks, for example, in conjunction with switching devices such as solenoids, relays, electromagnetic motor controllers, transistors, silicon controller rectifiers, or triacs, for example. The motor control means 12 will be activated based on the state of the various switches, pushbuttons, relay contacts, or electrical interlocks. When the motor control means is activated, it will attempt to provide the electric starting motor with power.

A driven component 14 is included in the circuit. It is desirable that certain devices only receive power during engine starting (motor control means 12 activated) and engine running (alternator producing power). The driven component 14 is such a device. For example, a fuel shut-off solenoid may be included as a driven component. Such a device typically allows fuel to flow to the engine whenever the solenoid receives electrical power. It may be desirable that the fuel shut-off solenoid only receives power during engine starting or running. This will prevent inadvertent draining of the battery by the solenoid when the engine is stopped. Another example of a driven component 14 would be any interlocking relays (not shown) present in the electrical system, whose coil burden would drain the battery over time.

Without a current blocking means 13, the driven component 14 could drain the battery if left energized when the engine is stopped. Such a situation could occur, for example, if a "RUN" or "IGNITION" switch were accidentally left in an "ON" position.

The current blocking means 13 protects the battery by preventing current flow from the battery to the driven component 14 when the motor control means 12 is not activated. A result of this is that when the engine is not running, the driven component 14 will only draw current from the battery when the motor control means is activated. When the engine is running, the driven component 14 will receive power from the alternator. It is not desirable that the driven component 14 receives power when the engine is stopped. Therefore, the only time that the driven component 14 needs to receive power from the battery is during starting (motor control means 12 activated) when the alternator is not up to speed and producing electricity. The current blocking means 13 ensures that the driven component 14 cannot draw from the battery when the motor control means 12 is not activated.

Various methods of constructing the current blocking means 13 will be apparent to those skilled in the art. Such methods include use of a diode, transistor, silicon controlled rectifier, triac, or other electronic devices, for example. Alternative methods of constructing the current blocking means are possible and may include the use of a switch, relay, or controlled output contact.

Figure 2:
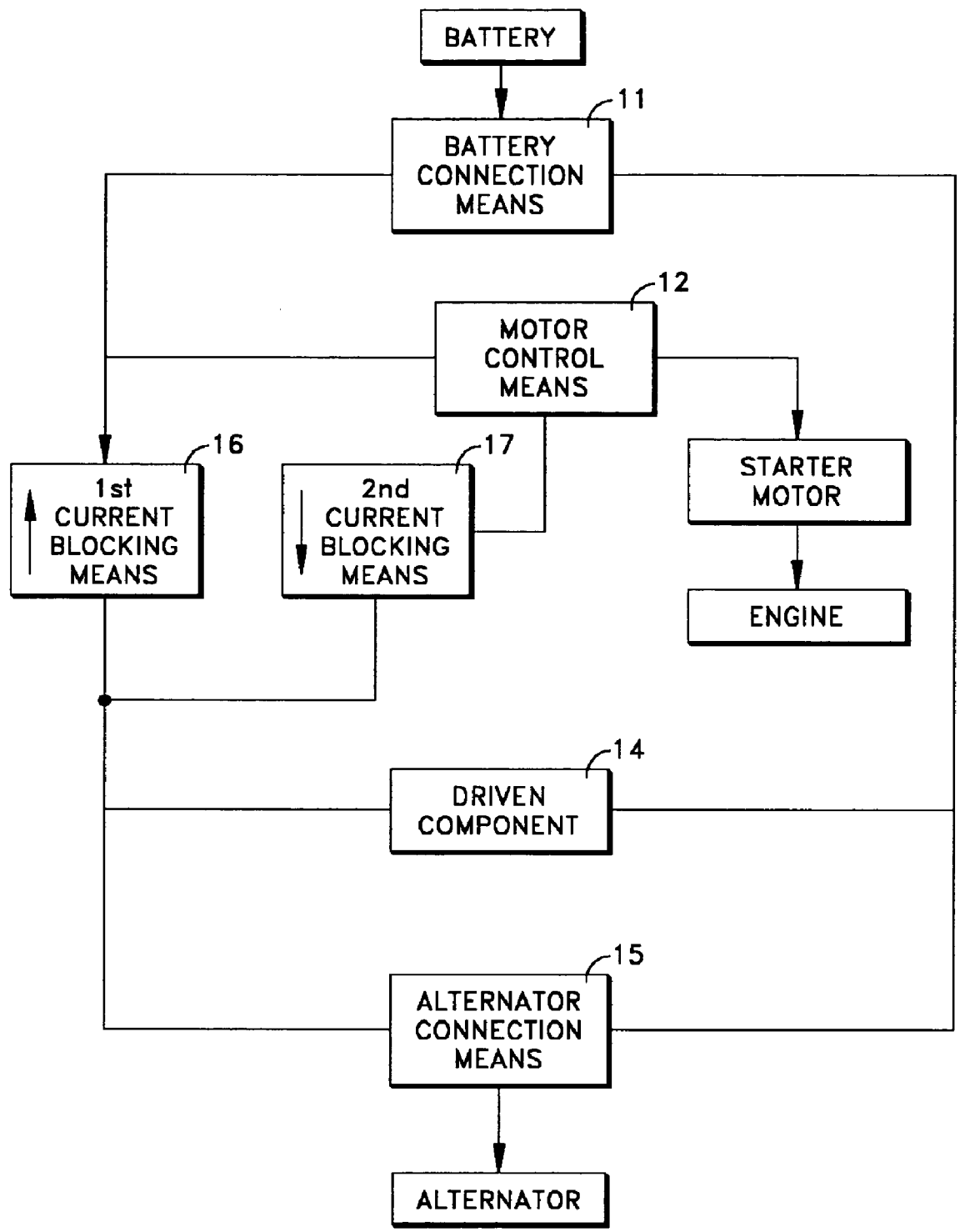
FIG. 2 is a second block diagram of an electrical system with battery protection in accordance with the present invention.

FIG. 2 shows a further embodiment of an electrical system with battery-protecting circuitry. This embodiment includes a first current blocking means 16 and a second current blocking means 17. The first current blocking means 16 prevents current from flowing from the battery to the driven component 14 while permitting current to flow to the battery from the alternator. The second current blocking means 17 allows current flow from the battery to the driven component 14 when the motor control means 12 is activated, but prevents current flow from the alternator to the motor control means 12. This arrangement protects the battery from inadvertent draining. It also prevents starting motor "run on" (continuously energizing the starting motor) by blocking current flow from the alternator to the motor control means 12 via the second current blocking means 17.

Various methods of constructing the first current blocking means 16 and second current blocking means 17 will be apparent to those skilled in the art. Such methods may include use of diodes, transistors, silicon controlled rectifiers, triacs, other electronic devices, or combinations thereof, as possible examples. Alternative methods of constructing the current blocking means include the use of a switches, relays, controlled output contacts, or combinations thereof, or in combination with other electronic devices, for example.

Figure 3:
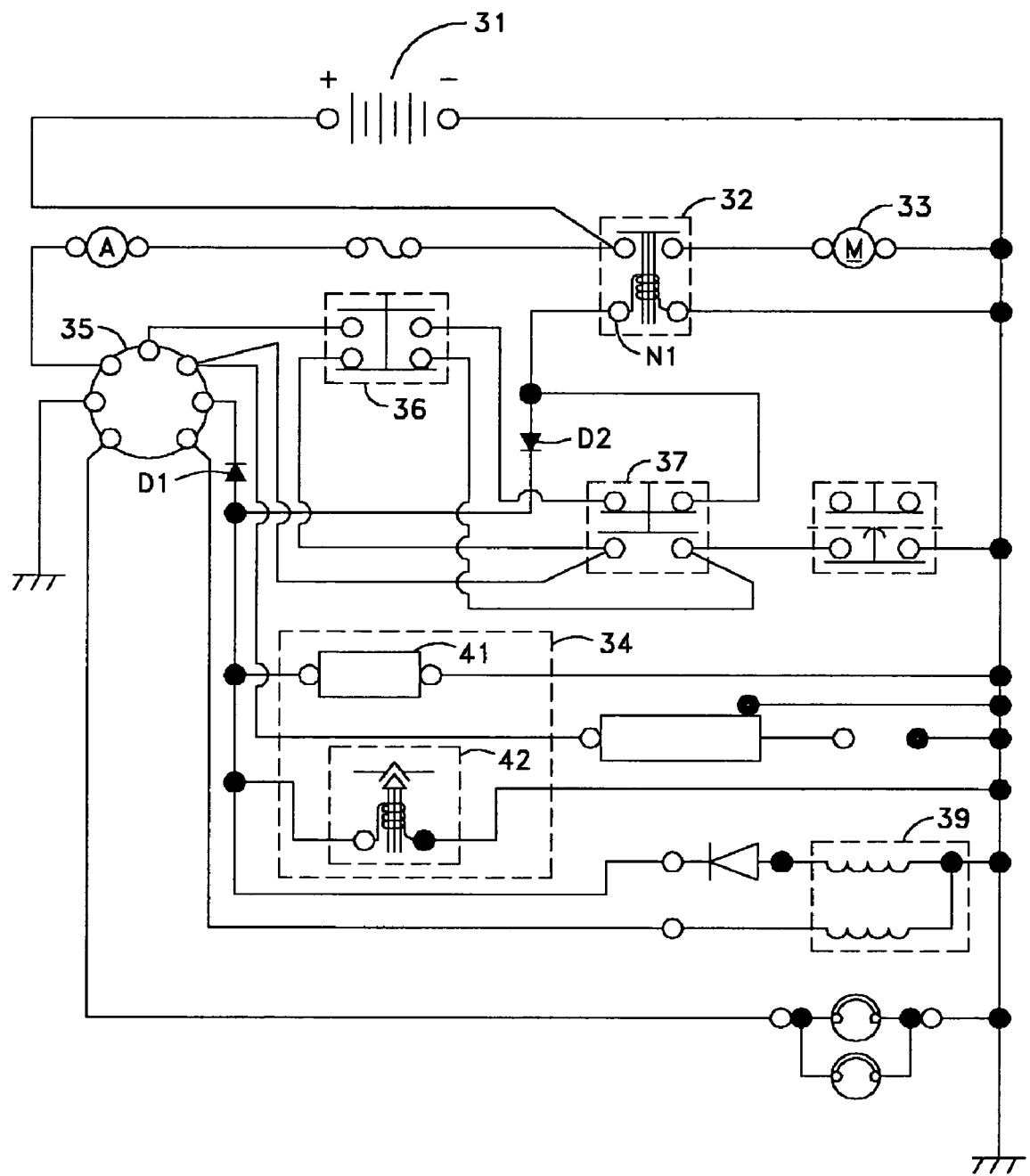
FIG. 3 is a schematic of an electrical system with unregulated battery charging and with battery protection in accordance with the present invention.

FIG. 3 is a schematic of an electrical system with unregulated battery charging and with battery protection according to this invention. The output of the alternator 39 is an AC current, which is typically rectified to a DC voltage and filtered by the capacitance of a battery 31 in the system. The alternator's 39 output charges the battery 31 and provides power to the system's electrical components.

Driven components 34 are collectively represented by the dashed line surrounding an hour meter 41 and fuel shut-off solenoid 42.

It is desirable that current flow from the battery 31 to the driven components 34 be prevented when the solenoid 32 is not energized in order to prevent inadvertent draining of the battery 31. The solenoid 32 controls an electric starting motor 33. When the solenoid 32 is energized, it completes electric starting motor's 33 power circuit. Energizing of the solenoid 32 is in turn controlled by the state of various switches, such as a run or ignition switch 35, clutch or brake switch 36, and attachment clutch switch 37. The combination of these switches 35, 36, 37 and solenoid 32 is analogous to the motor control means discussed previously. Therefore, in order to prevent inadvertent draining of the battery 31 by the driven components 34, current flow from the battery 31 to the driven components 34 should be prevented when the solenoid 32 is not energized.

A first diode D1 is included in the electrical system. This diode blocks current flow from the battery 31 to the driven components 34, preventing inadvertent draining of the battery. However, the first diode D1 permits charging current to flow from the alternator 39 through the first diode D1 and to the battery 31.

A second diode D2 permits current to flow from a first node N1 to the driven components. During engine starting, when the engine is not running and the solenoid 32 is energized to provide power to the electric starting motor 33, current will flow from the first node N1 through the second diode D2 to the driven components 34. Under such conditions, the battery 31 is supplying power to the driven components 34 through the first node N1 and second diode D2 because there is no output from the alternator 39 during engine starting. The second diode D2 also prevents electric starting motor 33 "run on" by blocking current flow from the alternator 39 to solenoid 32.

The combination of the first diode D1 and second diode D2 allows for charging of the battery 31 by the alternator 39 and powering of the driven components 34 by the battery 31 during engine starting, while preventing inadvertent discharging of the battery 31 when the engine is not running and further preventing electric starting motor 33 "run on." Skilled artisans will recognize other methods of achieving these functions without using diodes. Such methods include using transistors, silicon controlled rectifiers, triacs, other electronic devices, or combinations thereof, for example. Alternative methods include the use of switches, relays, controlled output contacts, or combinations thereof, or in combination with other electronic devices, for example.

Figure 4:
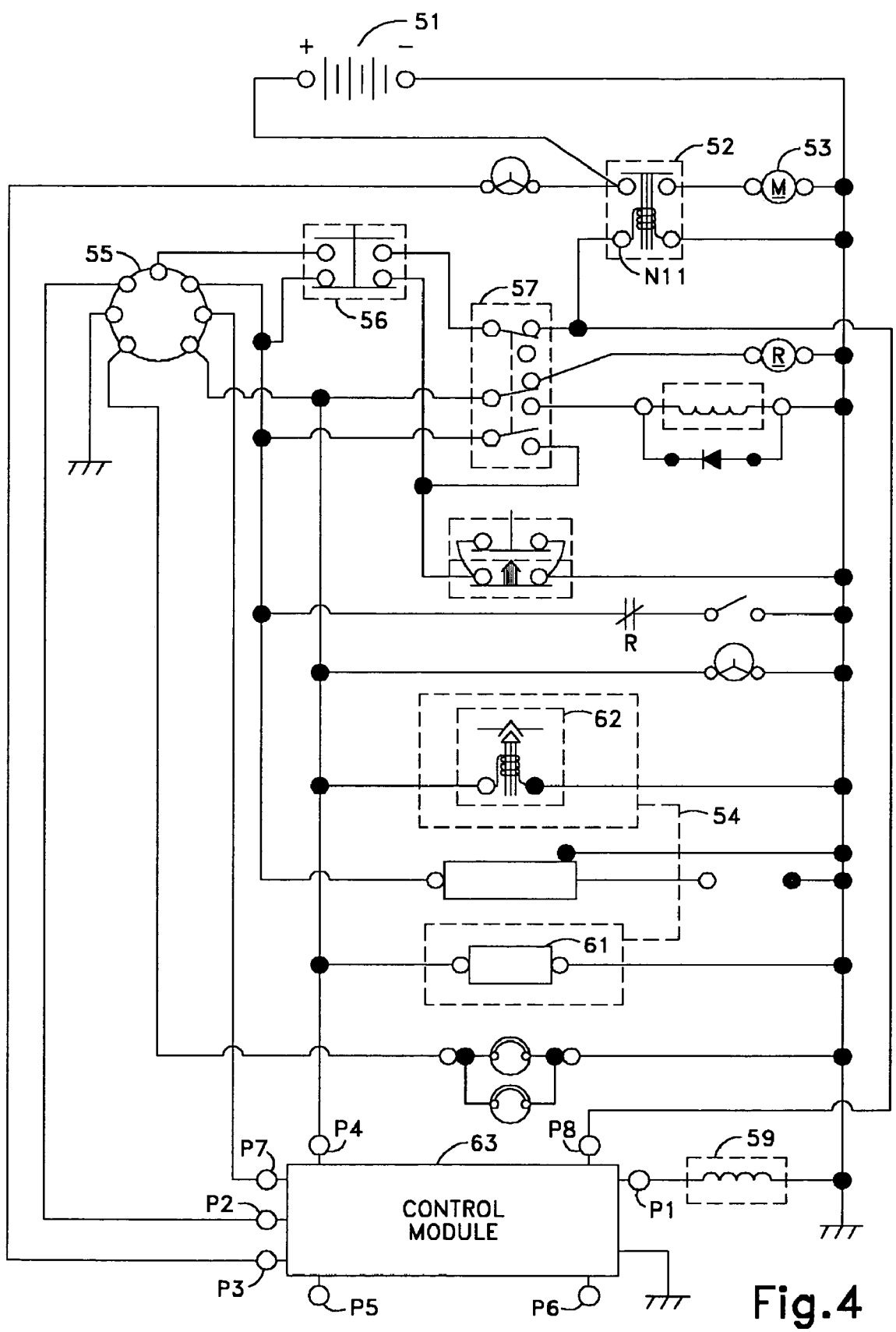
FIG. 4 is a schematic of an electrical system with regulated battery charging and with battery protection in accordance with the present invention.
Figure 5:
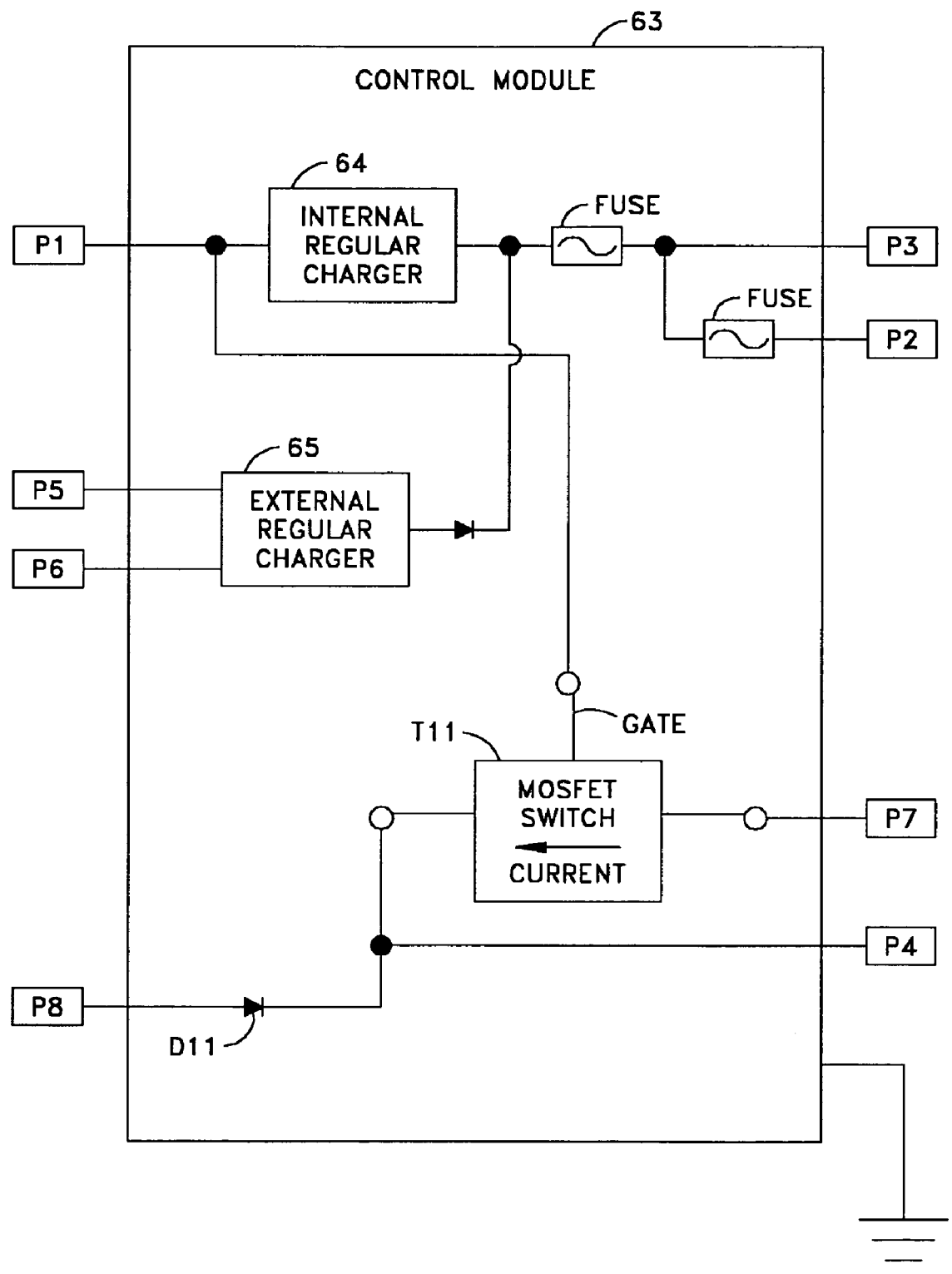
FIG. 5 is a schematic of a control module for regulated battery charging that includes battery protection in accordance with the present invention.

FIG. 4 is a schematic of an electrical system with regulated battery charging and with battery protection according to this invention. The system includes a control module 63, which can be seen in detail in FIG. 5. The control module 63 includes both an internal regulator charger 64 and external regulator charger 65. The voltage regulators 64, 65 rectify AC voltage and provide a stable DC output. The external regulator charger 65 is designed to rectify utility-supplied 120 V, 60 Hz power, while the internal regulator charger 64 rectifies the output of an alternator 59. Furthermore, the external regulator charger 65 is designed to keep the battery 51 charged when the engine is not in use. When the engine is running, the internal regulator charger 64 charges the battery 51 via the alternator 59.

Driven components 54 are represented by the connected dashed boxes surrounding an hour meter 61 and fuel shut-off solenoid 62.

Again, it is desirable that current flow from the battery 51 to the driven components 54 be prevented when the solenoid 52 is not energized. The solenoid 52 controls an electric starting motor 53. When the solenoid 52 is energized, it completes electric starting motor's 53 power circuit. Energizing of the solenoid 52 is in turn controlled by the state of various switches, such as a run or ignition switch 55, clutch or brake switch 56, and PTO disengaging switch 57. The combination of these switches 55, 56, 57 and solenoid 52 is analogous to the motor control means discussed previously. Therefore, in order to prevent inadvertent draining of the battery 51 by the driven components 54, current flow from the battery 51 to the driven components 54 should be prevented when the solenoid 52 is not energized.

The control module 63 includes a transistor T11 for blocking current from the battery 51 to the driven components 54 and preventing inadvertent draining of the battery. The transistor T11 is controlled by the output of the alternator 59. When the engine is running and the alternator 59 is producing electricity, the transistor T11 will be conductive, allowing current to flow to the driven components 54. Conversely, when the alternator is not producing electricity, the transistor T11 will not permit current flow, which protects the battery from inadvertent draining. In a preferred embodiment, the transistor T11 is comprised of a P-channel MOSFET. The transistor T11 does not prevent charging current from flowing to the battery 51 from the internal regulator charger 64 or external regulator charger 65.

A diode D11 permits current to flow from a first node N11 to the driven components. During engine starting, when the engine is not running and the solenoid 52 is energized to provide power to the electric starting motor 53, current will flow from the first node N11 through the diode D11 to the driven components 54. Under such conditions, the battery 51 is supplying power to the driven components 54 through the first node N11 and diode D11 because there is no output from the internal regulator charger 64, which is supplied by the alternator 59. The diode D11 also prevents electric starting motor 53 "run on" by blocking current flow from the internal regulator charger 64, through the run or ignition switch 55, and to the first node N11.

The combination of the transistor T11 and diode D11 allows for powering of the driven components 54 by the battery 51 during engine starting, while preventing inadvertent discharging of the battery 51 when the engine is not running and further preventing electric starting motor 53 "run on." As discussed above, skilled artisans will recognize other methods of achieving these functions without using diodes and transistors.

If a fuel shut-off solenoid is to be used with any of the circuits described herein, it should be noted that the fuel shut-off solenoid would only receive power from the battery during starting while the motor control means is activated. The motor control means is typically deactivated (electric starting motor de-energized) before the engine comes up to speed. Therefore, there will typically be a short period of time before the motor comes up to speed and the alternator produces an output when the fuel shut-off solenoid is also de-energized. The fuel system of the engine should be designed to accommodate this brief interruption in fuel flow.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed:

1. A circuit for use in a device having an engine, comprising:
   a battery connection means for connecting to a battery;
   a motor control means for controlling an electric starting motor that starts the engine; and
   a driven component, which is not the electric starting motor, capable of receiving electric power from the battery connected to the battery connection means only when the motor control means is activated.

2. The circuit set forth in claim 1 further comprising an alternator connection means wherein the driven component is capable of receiving electric power from either the battery or the rectified output of an alternator connected to the alternator connection means.

3. A circuit, comprising:
a battery connection means;
an alternator connection means;
a motor control means for controlling an electric starting motor that starts an engine;
a driven component, which is not the electric starting motor, capable of receiving electric power from either a battery connected to the battery connection means or the rectified output of an alternator connected to the alternator connection means;
a first current blocking means for preventing current flow from the battery to the driven component and allowing current flow from the alternator to the battery; and
a second current blocking means for preventing current flow from the alternator to the motor control means and allowing current flow from the battery to the driven component only when the motor control means is activated.

4. The circuit set forth in claim 3 wherein the first and second current blocking means are diodes.

5. The circuit set forth in claim 3 wherein the first current blocking means includes either a diode or a transistor and the second current blocking means includes either a diode or a transistor.

6. A circuit, comprising:
a battery;
an alternator;
an electric starting motor for starting an engine;
a motor control means for controlling the electric starting motor;
a driven component, which is not the electric starting motor, capable of receiving electric power from either the battery or the rectified alternator output;
a first current blocking means for preventing current flow from the battery to the driven component and allowing current flow from the alternator to the battery; and
a second current blocking means for preventing current flow from the alternator to the motor control means and allowing current flow from the battery to the driven component only when the motor control means is activated.

7. The circuit set forth in claim 6 wherein the motor control means further includes a solenoid.

8. The circuit set forth in claim 7 wherein the motor control means further includes a run or ignition switch, a clutch or brake switch, and an attachment clutch switch.

9. The circuit set forth in claim 8 wherein the first and second current blocking means are diodes.

10. The circuit set forth in claim 8 wherein the first current blocking means includes either a diode or a transistor and the second current blocking means includes either a diode or a transistor.

11. A circuit, comprising:
a battery;
an alternator;
an internal regulator charger that receives an input voltage from the alternator and produces a stable DC output voltage;
an electric starting motor for starting an engine;
a motor control means for controlling the electric starting motor;
a driven component, which is not the electric starting motor, capable of receiving electric power from either the battery or the internal regulator charger;
a first current blocking means for preventing current flow from the battery to the driven component; and
a second current blocking means for preventing current flow from the internal regulator charger to the motor control means and allowing current flow from the battery to the driven component only when the motor control means is activated.

12. The circuit set forth in claim 11 wherein the motor control means further includes a solenoid.

13. The circuit set forth in claim 12 further comprising an external regulator charger capable of receiving a 120 V, 60 Hz input voltage and producing a stable DC output voltage.

14. The circuit set forth in claim 12 wherein the motor control means further includes a run or ignition switch and a clutch or brake switch.

15. The circuit set forth in claim 14 wherein the motor control means further includes a PTO disengaging switch.

16. The circuit set forth in claim 14 wherein the first and second current blocking means are diodes.

17. The circuit set forth in claim 14 wherein the first current blocking means includes either a diode or a transistor and the second current blocking means includes either a diode or a transistor.

18. The circuit set forth in claim 15 wherein the first and second current blocking means are diodes.

19. The circuit set forth in claim 15 wherein the first current blocking means includes either a diode or a transistor and the second current blocking means includes either a diode or a transistor.

20. The circuit set forth in claim 15 wherein the first current blocking means includes a transistor, the second current blocking means includes a diode, and which further comprises an external regulator charger capable of receiving a 120 V, 60 Hz input voltage and producing a stable DC output voltage.

* * * * *